United States Patent [19]
Eckardt et al.

[11] Patent Number: 6,138,564
[45] Date of Patent: Oct. 31, 2000

[54] MEANS FOR REGULATING PRESSURE IN A PRESSURE CHAMBER

[75] Inventors: Andreas Eckardt, Munich; Josef Schreieder, Malgersdorf; Hans Winter, Munich, all of Germany

[73] Assignee: Oce Printing Systems GmbH, Poing, Germany

[21] Appl. No.: 09/051,618

[22] PCT Filed: Jun. 17, 1996

[86] PCT No.: PCT/DE96/01067

§ 371 Date: Jun. 17, 1998

§ 102(e) Date: Jun. 17, 1998

[87] PCT Pub. No.: WO97/16777

PCT Pub. Date: May 9, 1997

[30] Foreign Application Priority Data

Oct. 27, 1995 [DE] Germany .......................... 195 40 165

[51] Int. Cl.$^7$ .................................................. B41F 13/56
[52] U.S. Cl. ............................. 101/228; 276/38; 276/45; 101/232; 101/407.1
[58] Field of Search ................................ 101/226, 407.1, 101/228, 410; 271/3.23; 226/38, 45; 137/116.5, 627.5; 73/1.79; 399/322

[56] References Cited

U.S. PATENT DOCUMENTS

| | | | |
|---|---|---|---|
| 4,625,750 | 12/1986 | Scholz | 137/116.5 |
| 4,791,954 | 12/1988 | Hasegawa . | |
| 4,823,749 | 4/1989 | Eisenmann et al. . | |
| 5,036,468 | 7/1991 | Roselli | 701/20 |
| 5,086,641 | 2/1992 | Roselli | 73/1.79 |
| 5,476,041 | 12/1995 | Czotscher | 101/232 |
| 5,627,633 | 5/1997 | Hoffmann et al. | 399/322 |
| 6,038,976 | 3/2000 | Hezmstä dter et al. | 101/410 |

FOREIGN PATENT DOCUMENTS

| | | |
|---|---|---|
| 37 23 284 A1 | 1/1988 | Germany . |
| WO 94/09408 | 4/1994 | WIPO . |
| WO 94/27193 | 11/1994 | WIPO . |

OTHER PUBLICATIONS

Patent Abstracts of Japan—JP7180589—Jul. 18, 1995—Imada Shogo—Idling Speed Control Device.

Patent Abstracts of Japan—JP63184116—Jul. 29, 1988—Kuraoka Hiroaki—Fluid Pressure Servo Device and Braking Pressure Controller for Vehicle.

*Primary Examiner*—Eugene Eickholt
*Attorney, Agent, or Firm*—Hill & Simpson

[57] ABSTRACT

For regulating the pressure in a pressure chamber, in particular in a pneumatic brake apparatus for a web-type recording medium, an actual pressure is set in the pressure chamber dependent on an actual angle of rotation of a rotary valve. The actual angle of rotation of the rotary valve and the actual pressure in the pressure chamber are acquired. A target pressure and a target angle of rotation allocated to this target pressure are predetermined, and a pressure deviation between the actual pressure and the target pressure are determined, as is a deviation of the angle of rotation between the actual angle of rotation and the target angle of rotation. An adjusting unit sets the angle of rotation at the rotary valve, first dependent on the deviation of the angle of rotation and then dependent on the pressure deviation. Furthermore, a sensor for acquiring the angle of rotation is specified.

16 Claims, 6 Drawing Sheets

MEANS FOR REGULATING PRESSURE IN A PRESSURE CHAMBER

BACKGROUND OF THE INVENTION

The invention relates to a system for regulating pressure in a pressure chamber, in particular in a pneumatic brake apparatus for a web-type recording medium, in which an actual pressure in the pressure chamber is adjusted dependent on an actual angle of rotation of a rotary valve.

A system of this sort is known from the reference WO 94/27 193. The actual pressure in the pressure chamber is a partial vacuum in relation to the air pressure outside the pressure chamber. Via suction ducts in the surface of the pressure chamber, the partial vacuum suctions the recording medium on which a print image is printed. By means of the suction, and a high frictional force connected therewith between the recording medium and the surface of the pressure chamber, a braking of a transport motion of the recording medium takes place. A pressure sensor arranged in the pressure chamber acquires the actual pressure, which is compared with a predetermined target pressure by means of a control unit, whereby a pressure deviation is determined. Dependent on the pressure deviation, the control unit controls a directcurrent motor for the adjustment of the angle of rotation of the rotary valve with defined voltage impulses in order to reduce or completely remove the pressure deviation.

If a given actual angle of rotation is set at the rotary valve, e.g. by rotating a rotating piston in the valve by the actual angle of rotation on the basis of a reference setting, the pressure in the pressure chamber changes gradually due to pressure compensation processes, until finally a pressure corresponding to the angle of rotation is built up in the pressure chamber. The pressure build-up in the pressure chamber thereby takes place relatively sluggishly. The control unit can determine the presence of a pressure deviation only at a late time, and drives the direct-current motor with a considerable time delay, in order to remove the pressure deviation. The sluggishness of the pressure build-up thus retards the regulation to the target pressure.

This sluggishness is particularly disadvantageous if the frictional relationships in the rotary valve change dependent on time, so that given a driving of the direct-current motor with the defined voltage impulses, an angle of rotation not corresponding to these voltage impulses arises at the control valve, whereby a pressure deviation results that becomes greater as the wear on the rotary valve increases. In addition, the achieved angle of rotation of the rotary valve can differ given identical driving of the direct-current motor, due to tolerance-dependent differences in the direct-current motors. Pressure deviations likewise result from this, which are determined only with a delay by the control unit, with the aid of the pressure sensor.

The sluggishness of the controlling has the result that the actual pressure in the pressure chamber can deviate from the target pressure over a long period of time. In this time period, the pneumatic brake apparatus brakes the web-type recording medium either too weakly or too strongly. Both cases have the result that errors in printing occur, and the print image worsens.

From DE 37 23 284 A1, a pressure regulator is known in which a rotary valve is first adjusted by means of measurement of an actual valve position and comparison with a target valve position, and then controlling the target pressure via the measurement signal of a pressure sensor.

From JP 63-184 116 A, a method is known for adjusting the pressure in a braking apparatus. The pressure of a brake fluid is thereby first set by regulation of the piston position of a valve piston, and then by acquiring the actual pressure, with subsequent regulation.

SUMMARY OF THE INVENTION

An object of the invention is to indicate a system for regulating the pressure in the pressure chamber that permits rapid adjustment of the target pressure in the pressure chamber and permits larger pressure deviations to be avoided.

By system of the invention, a method is provided for regulating the pressure in a pressure chamber, in particular in a pneumatic brake apparatus for a web-type recording medium. In the method, an actual pressure in the pressure chamber is set dependent on an actual angle of rotation of a rotary valve. The actual angle of rotation of the rotary valve and the actual pressure in the pressure chamber are acquired. A target pressure and a target angle of rotation allocated to this target pressure are predetermined, a pressure deviation between the actual pressure and the target pressure, as well as a deviation in angle of rotation between the actual angle of rotation and the target angle of rotation, are determined, and an adjustment unit sets the angle of rotation at the rotary valve, first dependent on the deviation of the angle of rotation, then dependent on the pressure deviation.

By means of the acquiring of the actual angle of rotation, besides the actual pressure a second controlling quantity is used in the control unit for controlling in the invention. The control unit then acquires pressure deviations and deviations in the angle of rotation by means of difference formation between the target pressure and the actual pressure, or, respectively, between the target angle of rotation and the actual angle of rotation. In order to remove the pressure deviation only by acquiring the actual pressure, a long control time is necessary, due to the sluggish pressure build-up in the pressure chamber. However, the deviation in the angle of rotation, calculated via the actual angle of rotation, which can be acquired immediately, can be reduced immediately after the driving of the adjustment unit, which is for example formed by a direct-current motor. In order to avoid larger pressure deviations over a longer time in the pressure chamber, for the setting of a given target pressure the deviation of the angle of rotation is thus first removed in the control loop, by controlling the adjustment unit in such a way that the actual angle of rotation corresponds to the target angle of rotation. Since a given target angle of rotation is allocated to a given target pressure, i.e., that the approximate given target pressure arises in the pressure chamber after a longer time period at the given target angle of rotation, the actual pressure that arises lies in the vicinity of the target pressure.

If an approximately stable actual pressure has built up in the pressure chamber after a given time span, if warranted an acquired remaining pressure deviation is removed by driving the adjustment unit with further voltage impulses. In the invention, the target pressure arises rapidly in the pressure chamber, since due to the immediate correction of the deviation of the angle of rotation the pressure deviation in the pressure chamber is low, and can thus also be removed rapidly.

A preferred embodiment of the invention is that first a rough adjustment takes place of the pressure in the pressure chamber by adjusting the target angle of rotation allocated to the target pressure, dependent on the deviation of the angle of rotation, and subsequently a fine controlling on the basis of the pressure deviation takes place. By means of a rough adjustment of the pressure dependent on the deviation of the angle of rotation, a large pressure deviation is rapidly removed, or else never occurs in the first place, since the actual angle of rotation can be acquired immediately after the driving of the adjustment unit. If a stable pressure has built up in the pressure chamber after a certain time, and if small pressure deviations are still present, the small pressure deviation is removed by setting an angle of rotation at the rotary valve that compensates the pressure deviation. A correction of the pressure thus takes place. The pressure deviation is caused e.g. by differences between the recording media, which, despite standardizations, cannot entirely be avoided, or by a worsening of the pressure relationships in the pressure chamber due to a possible full dust filter in a connection line between the pressure chamber and the rotary valve, as well as by other disturbing quantities.

A further preferred embodiment of the invention is that the rotary valve is a rotary piston valve that permits a pressure compensation in a first angle region between an ambient pressure and the pressure in the pressure chamber, and also that, in a second angle region adjacent to the first angle region, the rotary piston valve sets a pressure in the pressure chamber that runs approximately linearly as the angle of rotation increases.

The design of such a rotary piston valve can be learned from the publication WO 94/27 193. The first angle region is necessary to enable a rapid aeration of the pressure chamber when for example there are disturbances in the recording. The second angle region, in which the rotary piston valve is located during the regulation of the pressure by the control unit, is connected immediately to the first angle region, in order to ensure rapid aeration of the pressure chamber in particular situations of operation. For the aeration, only a small angle region need be crossed in order to move from the second angle region into the first angle region. Since the pressure in the pressure chamber runs in linear fashion as the angle of rotation increases, a constant driving of the adjustment unit is possible over the entire second angle region, in order to achieve the same effects. If the control unit drives the adjustment unit with the same defined voltage impulses, there results in the overall second angle region, due to the identical voltage impulses, an identical increase in the angle of rotation, and, due to the linearity of the pressure increase, an identical change in the pressure in the pressure chamber.

The invention further relates to a means for regulating the pressure in a pressure chamber, in particular in a pneumatic brake apparatus for a recording medium. The means contains a rotary valve for setting an actual pressure in the pressure chamber dependent on an actual angle of rotation and a sensor for the angle of rotation, for acquiring the actual angle of rotation, as well as a pressure sensor for acquiring the actual pressure. The means furthermore has a control unit for predetermining a target pressure and a corresponding target angle of rotation, whereby the control unit determines a pressure deviation between the actual pressure and the target pressure, as well as a deviation in the angle of rotation, between an actual angle of rotation and a target angle of rotation, and whereby the control unit drives an adjustment means for setting the angle of rotation, first dependent on the deviation of the angle of rotation, and then dependent on the pressure deviation.

Through the use of a means of this sort, it is achieved that the target pressure in the pressure chamber can be adjusted rapidly, and larger pressure deviations do not occur.

A further aspect of the invention relates to a sensor for acquiring the angle of rotation, in particular the angle of rotation of a rotary valve. The sensor has a magnetic field sensor for producing an electrical signal with an at least approximately sinusoidal curve, dependent on the direction of a magnetic field penetrating the magnetic field sensor, and a magnetic arrangement for producing the magnetic field, whereby a relative rotation between the magnetic field and the magnetic field sensor takes place when the angle of rotation is displaced. The sensor is characterized by a magnetic reference sensor that produces a reference signal when the magnetic field acts in a predetermined reference angle region.

When the angle of rotation is displaced, there occurs a relative rotation between the magnetic field and the magnetic field sensor, by which means the acquisition of the angle of rotation takes place without contact. Advantageously, the magnetic field thereby rotates, and the magnetic field sensor, provided with line terminals, is at rest. By means of the use of a contactless sensor for the angle of rotation, wear on the sensor for the angle of rotation is excluded. An overrotation of the sensor, and resulting damage to the sensor, cannot occur, since the magnetic field and the magnetic field sensor are mechanically separate from one another.

By means of the arrangement of a magnetic reference sensor in the region of effectiveness of the magnetic field, the magnetic field, which also penetrates the magnetic field sensor, also penetrates the reference sensor, so that further constructive measures concerning the reference sensor are omitted. The reference sensor brings it about that an angle region of the electrical signal designated as a reference angle region is unambiguously defined. In this reference angle region, besides the electrical signal of the magnetic field sensor there also occurs a characteristic reference signal. If the sensor is for example used in a control unit, then at the beginning of a control process a defined angle of rotation can be set by selecting the reference angle region in a search run. Based on the reference angle region, it is then possible unambiguously to set angles of rotation for the controlling, since due to the sinusoidal curve of the electrical signal a voltage value is allocated to each angle of rotation.

With the aid of the reference angle region, in addition to the angle of rotation the direction of rotation can also be acquired, if, at the limits of the reference angle region, two electrical signals of different sizes occur at the magnetic field sensor. If for example the reference angle region is exited, whereby the reference signal changes, then the respective limit of the reference angle region is unambiguously determined according to the size of the electrical signal at the magnetic field sensor, said limit agreeing with the current angle of rotation. The angle of rotation must accordingly have changed within the reference angle region, in the direction of this limit. Analogously, the direction of rotation results when the angle of rotation enters the reference angle region.

Another embodiment of the invention is that the relative rotation takes place dependent on the angle of rotation of a rotary valve that sets a pressure in a pressure chamber. A rotary valve, as a component of a pneumatic or hydraulic regulating or control unit, places particular requirements on the means connected with it. These requirements include that after a disturbance, such as a power failure, a sensor unit that acquires the angle of rotation of the rotary valve can acquire the last position of the angle of rotation when power is restored. The inventive sensor fulfills this requirement, since according to the angle of rotation an analog signal corresponding to the respective angle of rotation arises at the magnetic field sensor when power is restored. A further requirement is that for reasons of safety a complete rotation of the rotary valve must be possible. The sensor according to the invention operates without contact and has no mechanical limitation of the angle of rotation. As a rotary valve, a rotary piston valve with the above-mentioned characteristics can advantageously be used.

In an exemplary embodiment of the invention, the magnetic arrangement contains a carrier that turns about an axis of rotation that runs through the magnetic field sensor, whereby a first permanent magnet is fastened to a first end of the carrier, and a second permanent magnet, with a pole arrangement running in an opposite direction, in the direction of the axis of rotation, is fastened to a second end of the carrier. By means of the arrangement of the two permanent magnets in the form of a quadrupole, there results a stronger magnetic field in comparison with a single dipole formed by one of the permanent magnets. The magnetic field that penetrates the magnetic sensor is thereby approximately linear. If the permanent magnets have to one another an identical distance from the axis of rotation, there arises a symmetrical field arrangement with respect to the magnetic field sensor. By means of these measures, the electrical signal of the magnetic field sensor approximates an exact sinusoidal curve. The magnetic field is further amplified if the carrier is made of a material with low magnetic resistance, e.g. iron, so that the magnetic field is concentrated by the carrier.

In a further exemplary embodiment of the invention, the reference sensor is a Hall switch switched by the first permanent magnet. A Hall switch is an electrical apparatus that contains a Hall element and an electrical circuit that processes the signal thereof. The circuit is designed in such a way that, given an angle of rotation at one of limits of the reference angle region, the reference signal has a steep edge. The limits of the reference angle region, and thus also the reference angle region itself, can be acquired precisely on the basis of the steep edges.

In a development of the invention, the sensor contains a further magnetic field sensor that is arranged so as to be rotated by approximately 45° relative to the first magnetic field sensor. Over a full angle region of 360°, at least one of the electrical signals of the two magnetic field sensors has an approximately linear curve in an angle region of approximately 45°. By means of a comparison of the two electrical signals, within two angle of rotation regions of 180° each the angle of rotation can be determined unambiguously. By means of the reference signal, the two 180° regions can be distinguished from one another by, for example, increasing the angle of rotation in a search run until the reference signal has a value that is characteristic for the reference angle region. Based on the reference angle region, it is then possible, as described above, to acquire and set the angle of rotation unambiguously. There thus results a contactless analog sensor for the angle of rotation for an angle region of 360°, with unambiguous recognition of the angle of rotation and direction of rotation and without rotational limitation.

In a further development, the sensor can contain several reference sensors whose reference angle regions border on one another and cover an angle region of 360° in a defined manner. By means of this measure, the search run at the beginning of a control process is no longer necessary. By means of the reference sensors, there ensues a rough resolution of the angle of rotation. A fine resolution takes place via the electrical signal(s) of the magnetic field sensor(s). If there are disturbances, such as for example power failure, the last angle of rotation is acquired when operational readiness is restored. The angle of rotation is thereby arbitrary.

In particular, in a pneumatic and hydraulic unit, damage can be avoided when operational readiness is restored if the angles of rotation of valves are acquired immediately when operational readiness is restored, and the restoring of operational readiness takes place differently dependent on these angles of rotation.

In the following, exemplary embodiments of the invention are explained on the basis of the drawings.

DESCRIPTION OF THE PREFERRED EMBODIMENTS

Figure 1:
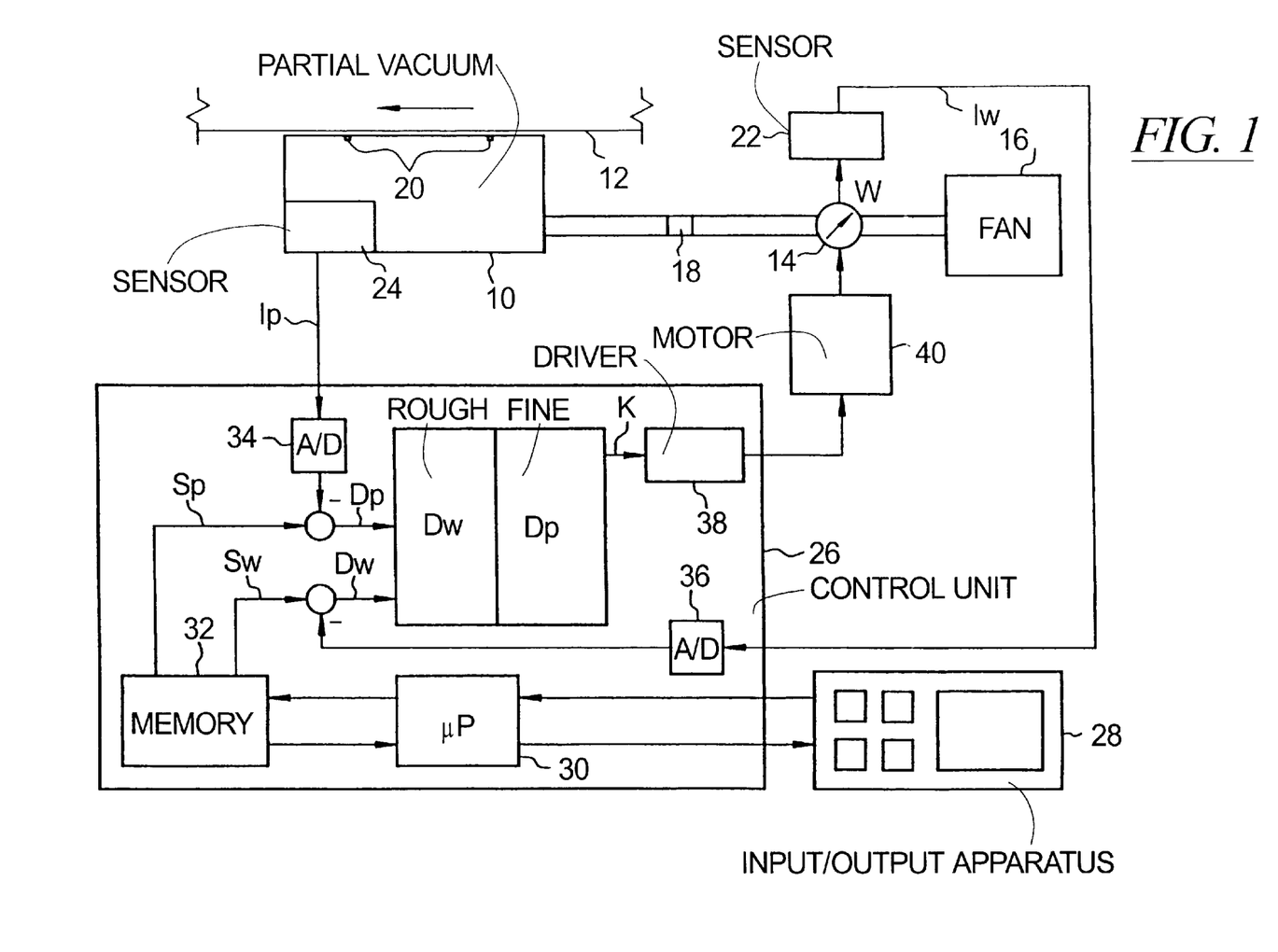
FIG. 1 shows a schematic representation of a unit for carrying out the method of the invention for regulating pressure in a pressure chamber.

FIG. 1 shows a schematic representation of a means for carrying out the method for regulating pressure in a pressure chamber 10. The pressure chamber 10 is a component of a pneumatic brake apparatus for braking a web-type recording medium 12. The recording medium 12 is formed of endless paper on which a print image is printed in a printer. The pressure chamber 10 is connected with a fan 16 via a rotary piston valve 14, so that a corresponding partial vacuum arises in the pressure chamber 10, dependent on the angle of rotation W of the piston in the rotary piston valve 14. A filter 18 is located between the pressure chamber 10 and the rotary piston valve 14, which keeps dust away from the rotary piston valve 14 and from the fan 16.

By means of the partial vacuum in the pressure chamber 10, the recording medium 12 is suctioned via suction ducts 20. A transport movement of the recording medium 12, indicated by an arrow in FIG. 1, is braked by means of the frictional force between the recording medium 12 and the surface of the pressure chamber 10, which is increased during the suctioning.

The angle of rotation W of the piston of the rotary piston valve 14 is acquired with the aid of a sensor 22 for the angle of rotation, as the actual angle of rotation Iw. The partial vacuum in the pressure chamber 10 is acquired by means of a pressure sensor 24 as an actual pressure Ip. The actual angle of rotation Iw and the actual pressure Ip are control quantities that are supplied to a control unit 26.

The control unit 26 predetermines a given target pressure Sp, e.g. dependent on the weight of the recording medium 12 and the type of its material, as well as on operating parameters. The mentioned characteristics of the recording medium 12 can, alternatively, be acquired by means of sensors (not shown) or can be inputted manually with the aid of an input/output apparatus 28 that is connected with the control unit 26, or via a barcode reading apparatus (not shown). The operating parameters that are acquired by sensors include e.g. the print speed and the temperature during a fixing process. The target pressure Sp essentially determines the braking effect of the braking apparatus, since according to the partial vacuum present in the pressure chamber 10 the recording medium 12 is suctioned by the suction ducts 20 with differing strength, and is thus braked with differing strength.

A microprocessor 30 contained in the control unit 26 executes a control program stored in a memory 32. The control unit 26 also takes from the memory the target pressure Sp, which results from the weight of the recording medium 12, its type of material, and the print speed. For each possible target pressure Sp, a corresponding target angle of rotation Sw is in addition stored in the memory 32. If the control unit 26 sets the target angle of rotation Sw at the rotary piston valve 14, then after some time there approximately arises in the pressure chamber 10 a pressure that corresponds to the target pressure Sp. The connection between the target pressure Sp and the target angle of rotation Sw is given by a static characteristic curve between the actual angle of rotation Iw and the actual pressure Ip.

This static characteristic curve is recorded before a first commissioning, by setting particular actual angles of rotation Iw at the rotary piston valve 14, and measuring the resulting stable actual pressure Ip in the pressure chamber 10. By means of this measure, it is achieved that the sluggish dynamic behavior of the pressure in the pressure chamber 10 does not worsen the control speed. With the aid of a direct-current motor 40, the control unit 26 sets the target angle of rotation Sw, which is allocated to a given target pressure Sp, and waits until a stable pressure has built up in the pressure chamber 10. In addition, this actual pressure Ip now deviates only slightly from the target pressure Sp, since tolerances of the direct-current motor 40 and of the rotary piston valve 16 are taken into account in the recording of the static characteristic curve. These tolerances do not lead to pressure deviations Dp, whereby the target pressure Sp can be adjusted rapidly.

In addition, the control unit 26 contains two analog-digital converters 34 and 36. The analog-digital converter 34 or, respectively, 36 converts the analog actual pressure Ip or, respectively, the analog actual angle of rotation Iw into a digital quantity.

The control unit 26 determines a pressure deviation Dp from the difference of the target pressure Sp and the actual pressure Ip. A deviation Dw in the angle of rotation is determined from the difference between the target angle of rotation Sw and the actual angle of rotation Iw. Dependent on the pressure deviation Dw, the control unit 26 first determines a correction quantity K, and carries out a rough controlling of the partial vacuum in the pressure chamber 10. The correction quantity K is converted into analog voltage impulses with the aid of a power driver 38. These voltage impulses drive the direct-current motor 40, whose rotor is connected in rotationally fixed fashion with the piston of the rotary-piston valve 14. The correction quantity K is dimensioned in such a way that the deviation Dw in the angle of rotation is reduced, and finally goes completely to zero.

Subsequently, the control unit 26 waits for the establishment of an approximately stable actual pressure Ip in the pressure chamber 10. Dependent on a possible remaining pressure deviation Dp, the control unit 26 carries out a fine controlling, in that the correction quantity K is henceforth dimensioned so that the pressure deviation Dp is reduced, and finally disappears entirely. The target pressure Sp then corresponds to the actual pressure Ip. A cause of the remaining pressure deviation Dp is for example the dust filter 18, which becomes clogged during operation of the pressure chamber 10, and the change, connected therewith, in the static characteristic curve between the actual angle of rotation Iw and the actual pressure Ip.

Figure 2:
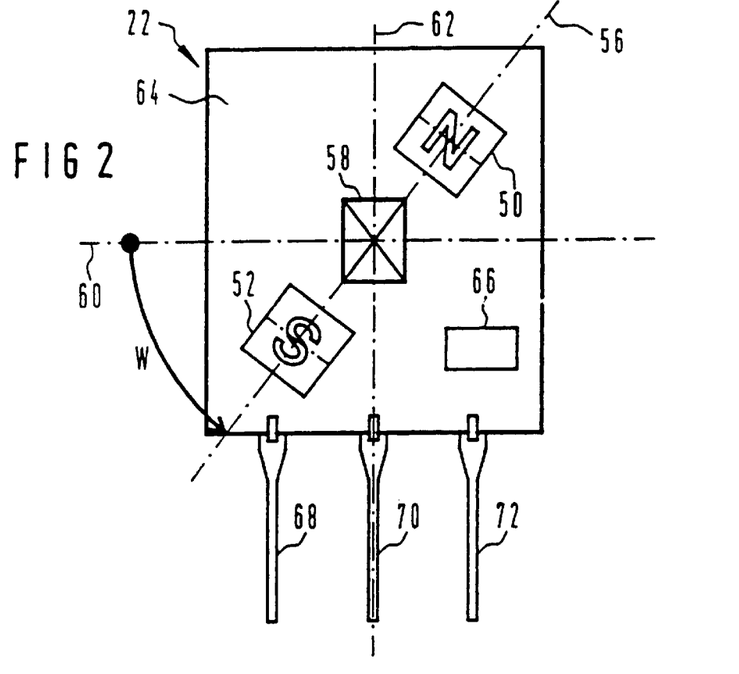
FIG. 2 shows a first sensor for the angle of rotation, in a front view.
Figure 3:
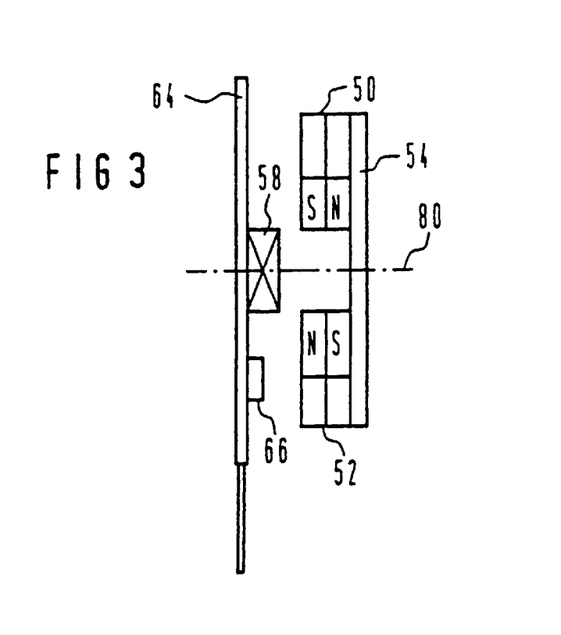
FIG. 3 shows a side view of the sensor according to FIG. 2 for the angle of rotation.

FIGS. 2 and 3 show a first exemplary embodiment of the sensor 22 for the angle of rotation, in a front view and a side view. Two permanent magnets 50 and 52 are fastened to a carrier 54 (not shown in FIG. 2 for clarity). The permanent magnet 50 is fastened, with a surface defining its north pole, to a first end of the carrier 54. The permanent magnet 52 is fastened to the other end of the carrier 54 with its surface defining the south pole. The carrier 54 is connected in rotationally fixed fashion with the piston of the rotary piston valve 14, so that, according to the position of the piston, an angle of rotation W arises in the way shown in FIG. 2 between a longitudinal axis 56 of the carrier 54 and the magnetic field sensor 58 or, respectively, the transverse axis 60 thereof, standing perpendicular to the longitudinal axis 62. The spacing of the permanent magnets 50 and 52 to the magnetic field sensor 58 is selected so that the magnetic field between the permanent magnets 50 and 52 maximally penetrates the magnetic field sensor 58. Dependent on the angle of rotation W, a voltage curve explained on the basis of FIG. 4 results at the outputs of the magnetic field sensor. The field line curve of the permanent magnets 50, 52 is shown in more detail in FIG. 5.

The magnetic field sensor 58 is fastened to a base plate 64. On the base plate 64 there is additionally located a Hall switch 66, which is switched by the magnetic field at the south pole S of the permanent magnet 50 and emits a reference signal produced by a contained circuit; the voltage curve of this signal is likewise further explained later on the basis of FIG. 4.

Terminal pins 68, 70 and 72 are fastened to the base plate 64, at which the voltage curve of the magnetic field sensor 58 can be picked off. Terminals for the Hall switch 66 are not shown.

In FIG. 3, the spatial arrangement of the base plate 64 and of the carrier 54, with the two permanent magnets 50 and 52, can be seen. The carrier 54 rotates about an axis of rotation 80 that runs centrally through the magnetic field sensor 58.

Figure 4:
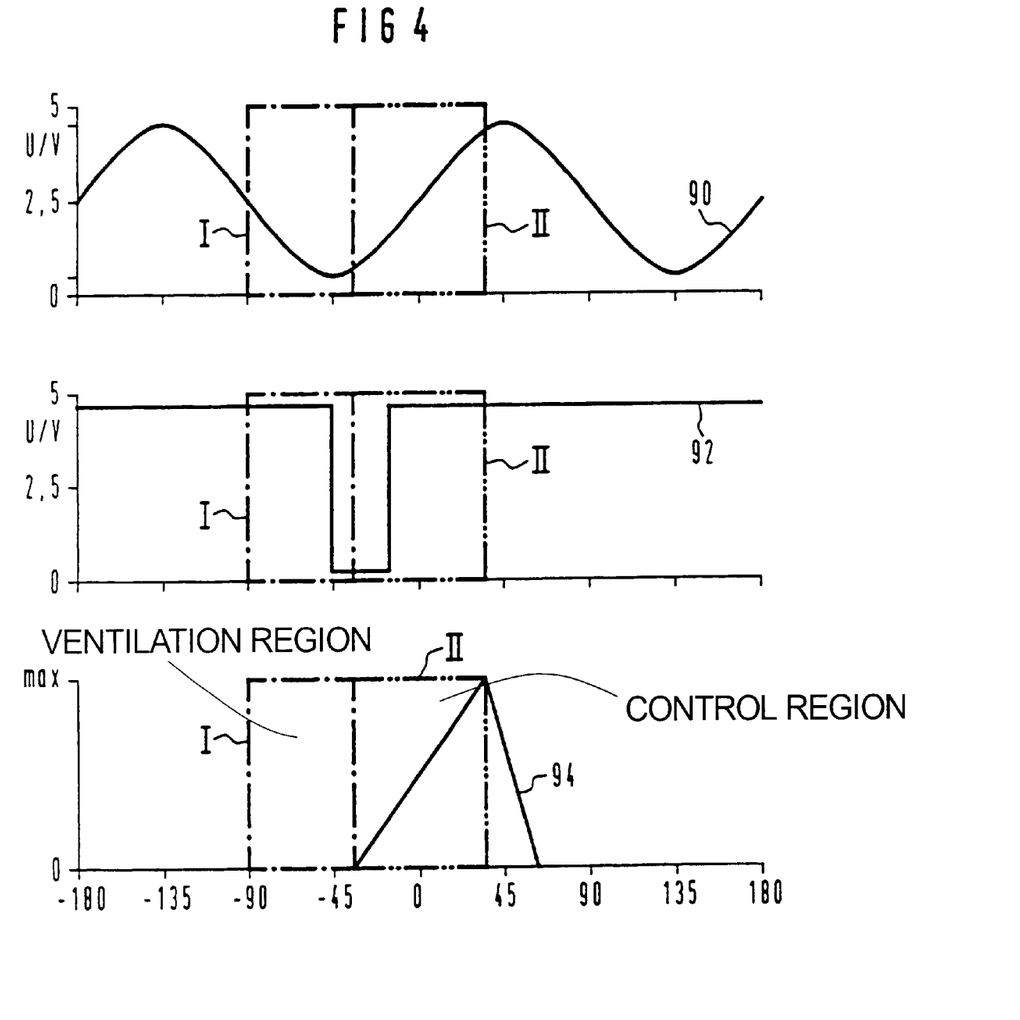
FIG. 4 shows the voltage curves of the output signal of a magnetic field sensor and of the reference signal of a Hall switch of the sensor of the angle of rotation according to FIG. 2, and the partial vacuum curve in the pressure chamber dependent on the angle of rotation.

FIG. 4 shows the voltage curves of the output signal at the magnetic field sensor 58 and of the reference signal at the Hall switch 66, as well as the partial vacuum curve in the pressure chamber 10, dependent on the angle of rotation W plotted on the abscissa, in a range from −180° to +180°.

The voltage curve of the output signal of the magnetic field sensor 58, dependent on the angle of rotation W, is shown in an upper part of FIG. 4. On the ordinate, the voltage is plotted in volts, in a range from 0 volts to 5 volts. The voltage curve agrees with a sine curve 90, displaced by 2.5 volts in the direction of the ordinate. The amplitude of the sine curve lies between about 0 volts and about 5 volts. The significance of an angle region underlaid with dark grey and one underlaid with light grey, I or, respectively, II, is explained in relation to FIG. 4.

FIG. 4 shows, in its central part, the voltage curve 92 of the reference signal of the Hall switch 66. On the ordinate, the voltage is in turn plotted in volts in a region from 0 to 5 volts. A reference angle region lies between about −45° and −20° in relation to the angle of rotation W=0° at the voltage value 2.5 V of the sine curve 90 of the output signal of the magnetic field sensor 58. A region of about 25° can be acquired with the aid of a single Hall switch 66. At −45°, there is a minimum of the sine curve 90. With the aid of the Hall switch 66, the falling and climbing part of the sine curve 90 can be distinguished from one another in the area of −45°. If the angle of rotation W is between −45° and −20°, then in addition to the electrical signal of the magnetic field sensor 58 there occurs a reference signal characterized by a voltage close to zero. In the reference angle region of −45° to −20°, the Hall switch 66 emits a voltage approximating zero. In this region, the south pole S of the permanent magnet 50 is located directly above the Hall switch 66. The electrical circuit in the Hall switch 66 causes the limits of the reference angle region to run relatively sharply. Outside the reference angle region, a voltage of almost 5 volts is adjacent to the Hall switch.

FIG. 4 shows, in its lower part, the partial vacuum curve 94 in the pressure chamber 10, dependent on the angle of rotation W or, respectively, on the actual angle of rotation Iw. The ordinate extends from a partial vacuum equal to zero to a maximum partial vacuum max. The rotary piston valve 14 is constructed in such a way that it has a ventilation region I, underlaid with dark grey in FIG. 4, and a control region II, underlaid with light grey in FIG. 4. In the ventilation region I, a rapid aeration of the pressure chamber 10 is possible, e.g. given disturbances in print operation, since a direct connection is produced from the pressure chamber 10 to the external air by means of the rotary piston valve 14. In the control region II, the partial vacuum that arises in the pressure chamber 10 depends in linear fashion on the actual angle of rotation Iw of the rotary piston valve 14. The piston of the rotary piston valve 14 is connected with the carrier 54 in such a way that the ventilation region I lies between −90° and −35°, and the control region II adjacent thereto lies between −35° and +35°. It is thereby achieved that, as can be seen in FIG. 4, the control region lies in an approximately linear part of the sinus curve 90, as can be seen on the basis of the agreeing light-grey hatched regions II in FIG. 4. As the partial vacuum W increases within the control region II, the partial vacuum in the pressure chamber 10 increases in linear fashion, and the output signal at the magnetic field sensor 58 increases in linear fashion at the same time. A linear controlling of the partial vacuum can thus be carried out with a stable control behavior and a reliable control result.

Upon commissioning of the control unit 26, this unit drives the direct-current motor 40 in a search run in such a way that the angle of rotation W at the rotary piston valve 14 increases. By this, the acquired actual angle of rotation Iw changes. The control unit 26 controls the direct-current motor 40 until almost no voltage is emitted by the Hall switch 66, and the actual angle of rotation Iw thus lies in the reference angle region. The voltage at the magnetic field sensor 58 is now an unambiguous criterion for the actual angle of rotation Iw. The control unit 26 can thus begin with the above-described regulation of the partial vacuum in the pressure chamber 10 to the target pressure Sp.

Figure 5:
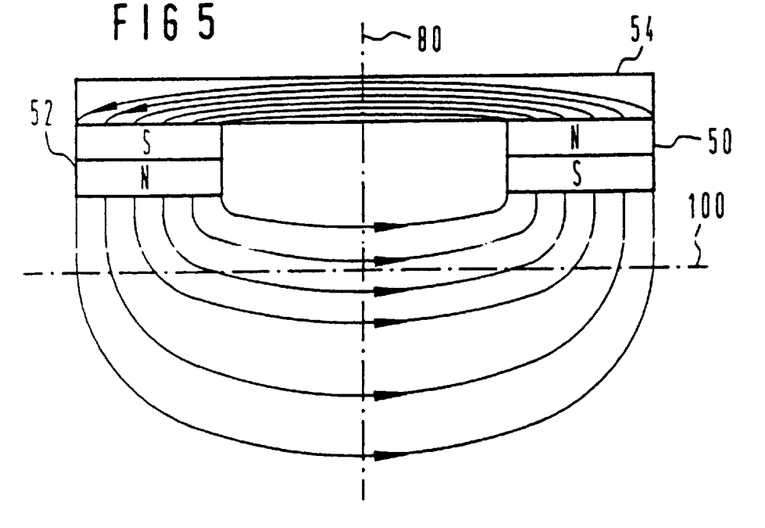
FIG. 5 shows the field line curve of the magnetic field in the sensor for the angle of rotation according to FIG. 2.

FIG. 5 shows the field line curve of the magnetic field between the permanent magnets 50 and 52 at the sensor 22 for the angle of rotation. The field lines are concentrated in the carrier 54, which is made of iron, due to the low magnetic resistance of the iron. The curve of the field lines in the region of the point of intersection of the axis of rotation 80 and a plane 100 is approximately parallel, and the field lines have an approximately equal spacing from one another, so that an approximately linear magnetic field penetrates the magnetic field sensor 58 (FIGS. 2 and 3) arranged in the point of intersection of the axis of rotation 80 and the plane 100.

Figure 6:
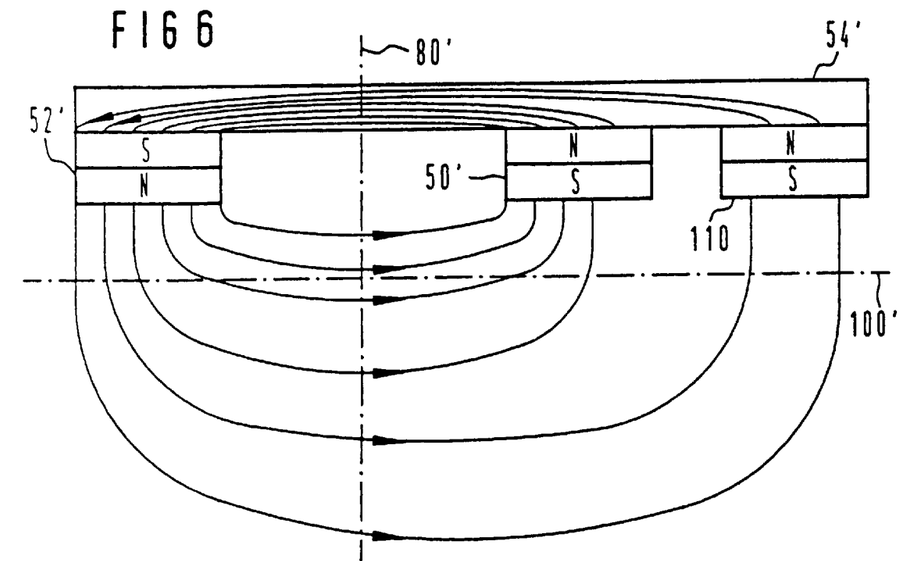
FIG. 6 shows the field line curve of the magnetic field of a second exemplary embodiment of a sensor for the angle of rotation.
Figure 7:
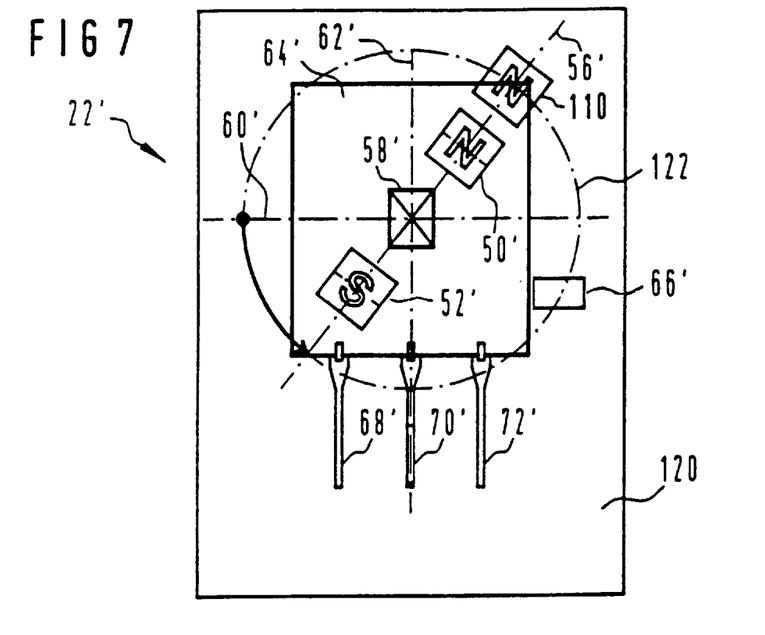
FIG. 7 shows the sensor for the angle of rotation according to FIG. 6, in a front view.

FIG. 6 shows the field line curve of the magnetic field of a second sensor 22' for the angle of rotation, which can be used in place of the sensor 22 for the angle of rotation according to the first exemplary embodiment, the construction of said second sensor being explained in relation to FIG. 7. The two sensors 22 and 22' for the angle of rotation are essentially of identical construction, so that respectively identical components, with agreeing reference characters marked with a stroke, are not explained again. The sensor 22' for the angle of rotation differs from the sensor 22 for the angle of rotation in that the Hall switch 66' (FIG. 7) is arranged outside the base plate 64', at a large distance from the magnetic field sensor 58'. The carrier 54' is lengthened in the direction of the first permanent magnet 50'. A further permanent magnet 110 is fastened to the lengthened first end with its surface defining the north pole. The permanent magnet 100 switches the Hall switch 66', located outside the base plate 64', with its magnetic field exiting at the south pole S. As can be seen in FIGS. 5 and 6, the magnetic field changes only insignificantly in the region of the magnetic field sensor 58' (FIG. 7) attached in the point of intersection of the axis of rotation 80' and the plane 100'. The curves concerning the angle of rotation W, shown in FIG. 4, are thus also valid for the sensor 22' for the angle of rotation.

FIG. 7 shows a front view of the sensor 22' for the angle of rotation, whose base plate 64' is arranged on a plate 120. On this plate 120 are located the Hall switch 66' on a circle of rotation 122 that is defined by the line of motion of the permanent magnet 110 in the rotation of the carrier 54'. The Hall switch 66' is arranged on the circle of rotation 122 in such a way that the voltage curve according to the middle part of FIG. 4 also holds for the Hall switch 66'.

Figure 8:
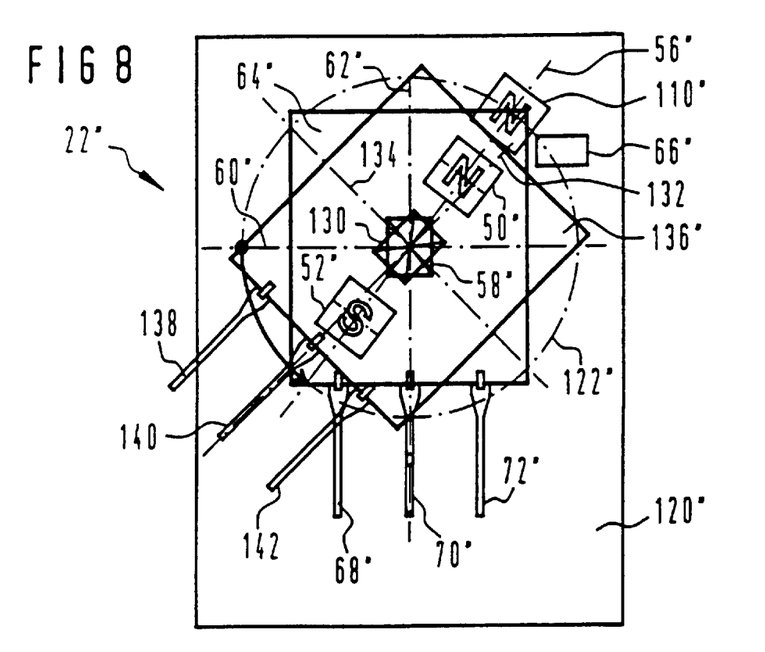
FIG. 8 shows a third exemplary embodiment of a sensor for the angle of rotation, in a front view.

FIG. 8 shows a sensor 22" for the angle of rotation, as a third exemplary embodiment. The sensors 22' and 22" for the angle of rotation are essentially of identical construction, so that, again, identical components having reference characters marked with a double stroke in FIG. 8 are not explained again. In the region of effectiveness of the magnetic field of the permanent magnets 50" and 52", a further magnetic field sensor 130 is arranged in such a way that it is rotated by −45° relative to the magnetic field sensor 58". A longitudinal axis 132, as well as a transverse axis 134 through the magnetic field sensor 130, are determined according to FIG. 8. The magnetic field sensor 130 is arranged on a further base plate 136. Terminal pins 138, 140 and 142, via which the voltage curve at the magnetic field sensor 130 is picked off, are connected to the base plate 136. Due to a different position on the circle of rotation 122", the Hall switch 66" has a different reference angle region, shown on the basis of FIG. 9, than do the Hall switches 66 and 66'.

Figure 9:
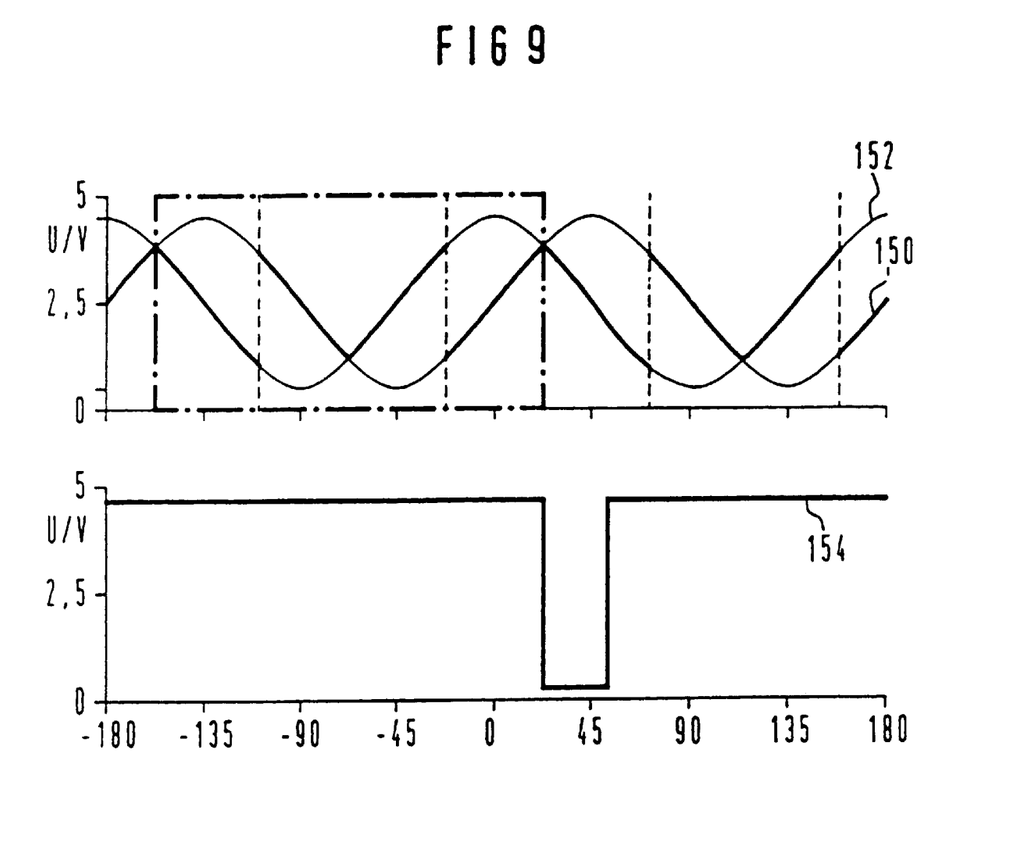
FIG. 9 shows the voltage curves of the output signals of magnetic field sensors and of a Hall switch of the sensor of the angle of rotation according to FIG. 8, dependent on the angle of rotation.

FIG. 9 shows the voltage curves of the output signals of the magnetic field sensors 58" and 130 and of the Hall switch 66", dependent on the angle of rotation W plotted on the abscissa in a region from −180° to +180°. On the ordinate, the voltage is respectively plotted in a region from 0 volts to 5 volts.

In its upper part, FIG. 9 shows voltage curves at the magnetic field sensors 58" and 130. The voltage curve at the magnetic field sensor 58" is again a sine curve 150 displaced by 2.5 V in the direction of the ordinate. The voltage curve at the magnetic field sensor 130 is a cosine curve 152 displaced by 2.5 V in the direction of the ordinate, and which is displaced by −45° in relation to the sine curve 150. The approximately linear regions of the sine curve 150 and of the cosine curve 152 are shown in bold in FIG. 2. The overall angle region of the sensor 22" of the angle of rotation, from −180° to +180°, is covered without gaps by the linear regions. In its lower part, FIG. 9 shows the voltage curve 154 of the reference signal at the Hall switch 66" of the sensor 22" of the angle of rotation. The reference angle region lies approximately between +25° and +50°.

If the sensor 22" of the angle of rotation is used in place of the sensor 22 of the angle of rotation, the overall angle of rotation W of the rotary piston valve 14 can be unambiguously acquired by the control unit 26 as an actual angle of rotation Iw, whereby the angle of rotation W and the voltage at the respective magnetic field sensor 58" or, respectively, 130 depend on one another in approximately linear fashion, in eight angle regions of 45° each. For the acquisition of the actual angle of rotation Iw, the control unit 26 respectively uses the voltage of the magnetic field sensors 58" and 130, which is located precisely in one of the linear regions. This voltage is unambiguously determined with two threshold value switches (not shown), since only one of the voltages of the magnetic field sensors 58" and 130 is respectively located in one of the linear regions, and the other voltage lies below a first threshold value or, respectively, above a second threshold value.

By means of comparison of the magnitude of the voltage in the linear region with the voltage outside this region, the control unit 26 unambiguously acquires an angle region of 180°, since two of the linear regions of the voltage at one of the magnetic field sensors 58" or, respectively, 130 respectively differ in that the voltage at the other magnetic field sensor 130 or, respectively, 58" is larger or, respectively, smaller. By means Although various minor modifications might be suggested by those skilled in the art, it should be understood that our wish to embody within the scope of the patent warranted hereon all such modifications as reasonably and properly come with the scope of our contribution to the art.

What is claimed is:

1. A system for regulating pressure in a pressure chamber of a pneumatic brake apparatus for a recording medium within a recording device, comprising:

a rotary valve for setting an actual pressure in the pressure chamber dependent on an actual angle of rotation;

an angle sensor for acquiring the actual angle of rotation;

a pressure sensor for acquiring the actual pressure;

a controller for predetermining a target pressure and a corresponding target angle of rotation dependent on at least one of characteristics of the recording medium and operating parameters during recording, the controller determining a pressure deviation between the actual pressure and the target pressure, as well as an angle of rotation deviation between the actual angle of rotation and the target angle of rotation of the rotary valve;

an adjustment unit connected for drive from the controller for setting the valve angle of rotation dependent both on the angle of rotation deviation and also on the pressure deviation;

said angle of rotation sensor comprising a magnetic unit for producing a magnetic field, a magnetic field sensor for producing an electrical signal and a magnetic reference sensor for producing a reference signal when the magnetic field acts in a predetermined reference angle region so that when the angle of rotation is displaced, a relative rotation occurs between the magnetic field and the magnetic field sensor; and the adjustment unit setting the angle of rotation at the rotary valve dependent first on the angle of rotation deviation and then dependent on the pressure deviation.

2. The system according to claim 1 wherein the target angle of rotation allocated to a given target pressure is determined dependent on the actual angle of rotation and with aid of a static characteristic curve of the actual pressure.

3. The system according to claim 1 wherein the controller provides at first a rough setting of the pressure in the pressure chamber takes place by adjustment of the target angle of rotation allocated to the target pressure dependent on the angle of rotation deviation, and subsequently a fine regulation takes place based on the pressure deviation.

4. The system according to claim 1 wherein the rotary valve is a rotary piston valve that permits a pressure compensation between an ambient pressure and the pressure in the pressure chamber in a first angle region, and as the angle of rotation increases in a second angle region bordering on the first angle region the controller and the adjustment unit controls the rotary piston valve sets a pressure in the pressure chamber that runs at least approximately linearly.

5. The system according to claim 1 wherein the reference angle region lies approximately between −45° and −20° with reference to the angle 0° at a zero crossing of the electrical signal of the magnetic field sensor.

6. The system according to claim 1 wherein the rotary valve is a rotary piston valve that permits a pressure compensation between an ambient pressure and the pressure in the pressure chamber in a first angle region, and in a second angle region bordering on the first angle region as the angle of rotation increases the controller and the adjustment unit control the rotary piston valve to set a pressure in the pressure chamber that increases or decreases continuously.

7. The system according to claim 6 wherein the second angle region lies approximately between −35° and 35° in reference to an angle 0° at a zero crossing of the electrical signal of the magnetic field sensor.

8. The system according to claim 1 wherein the magnetic arrangement contains a carrier that rotates about an axis of rotation running through the magnetic field sensor, a first permanent magnet being fastened to a first end of the carrier, and a second permanent magnet being fastened to a second end of the carrier, with a pole arrangement running in an opposed direction, in a direction of an axis of rotation.

9. The system according to claim 8 wherein the permanent magnets have an at least approximately equal spacing from the axis of rotation.

10. The system according to claim 8 wherein the carrier is made of a material with a low magnetic resistance.

11. The system according to claim 1 wherein the magnetic reference sensor is a Hall switch switched by a first permanent magnet.

12. The system according to claim 11 wherein a further permanent magnet which has a pole arrangement corresponding to the first permanent magnet, and which is oriented in a direction of an axis of rotation with a greater distance from the axis of rotation, is arranged on a first end of a carrier, the magnetic reference sensor, having at least approximately a greater distance from the axis of rotation.

13. The system according to claim 1 wherein a further magnetic field sensor is arranged so as to be rotated by about −45° relative to the magnetic field sensor.

14. The system according to claim 1 wherein reference sensors are provided whose reference angle regions border on one another and cover an angle region of 360° in a defined way.

15. A system for regulating pressure in a pressure clamber of a pneumatic brake apparatus for a recording medium within a recording device, comprising:

a rotary valve for setting an actual pressure in the pressure chamber dependent on an actual angle of rotation;

an angle sensor for acquiring the actual angle of rotation;

a pressure sensor for acquiring the actual pressure, and a controller for predetermining a target pressure and a corresponding target angle of rotation, dependent on at least one of characteristics of the recording medium and operating parameters during recording;

the controller determining a pressure deviation between the actual pressure and the target pressure, as well as an angle of rotation deviation between the actual angle of rotation and the target angle of rotation of the rotary valve, and an adjustment unit driven by the controller for setting a valve angle of rotation dependent both on the angle of rotation deviation and also on the pressure deviation; and the angle of rotation sensor comprising a magnetic unit for producing a magnetic field and a magnetic field sensor for producing an electrical signal, a magnetic reference sensor for producing a reference signal when the magnetic field acts in a predetermined reference angle region, and a relative rotation taking place between the magnetic field and the magnetic field sensor when the valve angle of rotation is displaced.

16. A pneumatic brake system, comprising:

a pneumatic brake apparatus for a recording medium within a recording device, said apparatus having a pressure chamber;

a rotary valve for regulating an actual pressure in the pressure chamber dependent on an actual angle of rotation;

an angle sensor for acquiring the actual angle of rotation of the rotary valve;

a pressure sensor for acquiring the actual pressure; and a controller for predetermining a target pressure and a corresponding target angle of rotation and for determining a pressure deviation between the actual pressure and the target pressure, as well as an angle of rotation deviation between the actual angle of rotation and the target angle of rotation of the rotary valve;

an adjustment unit connected for drive from the controller for setting the valve angle of rotation dependent both on the angle of rotation deviation and also on the pressure deviation; and said angle of rotation sensor comprising a magnetic unit for producing a magnetic field and a magnetic field sensor.

* * * * *